United States Patent [19]
Haunstetter et al.

[11] 4,203,032
[45] May 13, 1980

[54] ARRANGEMENT FOR PRODUCING A CONSTANT SIGNAL AMPLITUDE IN AN OPTO-ELECTRONIC SCANNING SYSTEM

[75] Inventors: Franz Haunstetter, Augsburg; Gerhard Koppelmann, Neubaldham, both of Fed. Rep. of Germany

[73] Assignee: Siemens Aktiengesellschaft, Berlin & Munich, Fed. Rep. of Germany

[21] Appl. No.: 923,995

[22] Filed: Jul. 12, 1978

[30] Foreign Application Priority Data

Aug. 4, 1977 [DE] Fed. Rep. of Germany ....... 2735245

[51] Int. Cl.$^2$ ............................................. G01J 1/32
[52] U.S. Cl. .................................... 250/205; 315/151
[58] Field of Search ............ 250/205, 237 G, 231 SE, 250/231 R; 315/151

[56] References Cited

FOREIGN PATENT DOCUMENTS 2443631  3/1976  Fed. Rep. of Germany .

Primary Examiner—David C. Nelms
Assistant Examiner—Darwin R. Hostetter
Attorney, Agent, or Firm—Hill, Van Santen, Steadman, Chiara & Simpson

[57] ABSTRACT

An arrangement for controlling a constant signal amplitude in an opto-electronic scanning system, for example in an incremental angle indicator, utilizes diaphragms which are periodically interposed between a light source and a light receiver. The brightness of the light source can be regulated by a light receiver which detects brightness. When arranged opposite a diaphragm gap, the light receiver of the opto-electronic scanning system supplies at the received value of the light to a storage device which stores the value for the duration of a dark phase produced by the diaphragm and the light value is applied to a circuit for regulating the brightness of the light source.

4 Claims, 2 Drawing Figures

ARRANGEMENT FOR PRODUCING A CONSTANT SIGNAL AMPLITUDE IN AN OPTO-ELECTRONIC SCANNING SYSTEM

BACKGROUND OF THE INVENTION

1. Field of the Invention

The present invention relates to an arrangement for controlling a constant signal amplitude in an opto-electronic scanning system, for example in an incremental angle indicator, where diaphragms are periodically interposed between a light source and a light receiver and where the brightness of the light source can be regulated by a light sensitive receiver which scans the light source.

2. Description of the Prior Art

In addition to magnetic or capacitive scanning systems, optoelectronic scanning systems are widely used for determining the position and condition of elements, in particular of moving elements. Therefore, for example, pulse train discs which are arranged on drive shafts and which are alternately provided with openings and screened areas, are passed between a light source and a light receiver of the opto-electronic scanning system, as a result of which it is possible to derive signals which can be used to determine the position of the drive shaft. The light receivers, for example photo transistors or photo resistors, and the following light amplifier and analysis circuits operate particularly well under conditions characteristic of these circuits which leads to the recognition that the brightness of the light source can be designed to be at an optimum, in particular also with respect to the general surrounding brightness and to stray light produced. Accordingly, it is desirable to design the light source for an optimum brightness. Fluctuations in the supply voltage and other environmental influences change both the characteristics of the brightness of the light source and also the characteristics of the light receiver. Optimum characteristics can be reestablished by regulating the brightness of the light source.

This regulation of the brightness of the light source can be carried out automatically in that the light source is constantly scanned by a further light receiver and the received value is used to regulate the brightness of the light source. This measure involves an additional expense and requires that the surface of the light source be sufficiently large that an additional light receiver is covered in an equivalent fashion.

Using the light receiver of the opto-electronic scanning system itself, in order to regulate the brightness of the light source, presents difficulties for the reason that when the light receiver is darkened by diaphragms moved between the light receiver and the light source for the purpose of scanning, the light source would become overmodulated.

SUMMARY OF THE INVENTION

Notwithstanding the above problem of overmodulation, it is the object of the present invention to provide an arrangement by means of which light receivers belonging to the opto-electronic scanning system are used to regulate the brightness of the light source. The opto-electronic scanning system primarily serves to produce digital scanning results.

An arrangement which achieves the foregoing is characterized, according to the present invention, in that when arranged opposite a diaphragm gap the light receiver of the opto-electronic scanning system feeds the received value of the light to a storage device which stores this value for the duration of a dark phase produced by the diaphragm, and that the stored light value is applied to a circuit which serves to regulate the brightness of the light source.

The arrangement in accordance with the features of the invention ensures that the light receiver of the opto-electronic scanning system can itself be used to regulate the brightness of the light source. Therefore, it is no longer necessary to provide additional light receivers which are constantly illuminated by the light source. Additional light receivers often, in fact, lead to problems in respect of their spatial arrangement. The measures provided by the present invention ensure that during the functionally determined dark phases in the light receiver which occur when a diaphragm is moved in front of the light receiver for a limited period of time, no overmodulation of the light source occurs. Therefore, simple measures which can be achieved by means of highly integratable, electronic circuit elements provide a regulation of the brightness of the light source which ensures that the opto-electronic scanning system enjoys uniform, optimum scanning conditions which are necessary for a satisfactory operation in order to detect the state and the position of the element to be scanned.

In accordance with a preferred embodiment of the invention, the analysis line of the light receiver of the opto-electronic scanning system is coupled, via a rectifier link, to a memory which transiently store the voltage value corresponding to the maximum measured light and the stored voltage value thereof is fed to a regulating amplifier as a regulating value for the light source of the opto-electronic scanning system.

This embodiment of the arrangement, according to the present invention, is advantageously further developed inasmuch as the memory which has transient storage facilities is constructed from a capacitor-resistor path coupled via the rectifier link to the analysis line of the opto-electronic scanning system.

As will be gathered from the features which constitute a further development of the arrangement of the present invention, the arrangement can be achieved employing and exploiting extremely simple electronic circuitry measures. A fundamental feature of the construction of the memory which has transient storage facilities consist of the dark phase times. The time constants of the memory with the transient storage facilities, namely the values for the capacitor-resistor path should be selected in accordance with these times. For the use of an arrangement constructed in accordance with the present invention it is expedient to design the opto-electronic scanning system in such a manner that the dark phases achieved by means of the diaphragm are as equal as possible in length and relatively short, whereas the bright phases can be selected to be extendible to arbitrary length. This means that stationary phases of the diaphragms to be scanned should occur during the bright range.

As the opto-electronic scanning system is to recognize dark phases produced by moving diaphragms as such and is to analyze these dark phases, a further development of an arrangement corresponding to the present invention comprises a switching element in the storage circuit, which element is controlled by the analysis circuit and changes the time constant of the memory.

As a result, it is possible to store the value within the memory for a longer duration during the functionally determined dark phase and, therefore, to maintain constant the regulating value for the brightness of the light source for this length of time.

When a plurality of opto-electronic scanning systems are provided having a common light source, it is, of course, sufficient to operate the arrangement corresponding to the invention only by one of the light receivers. Under these circumstances it is expedient to select a light receiver wherein the least, the shortest and/or the most uniform dark phases are likely to occur.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
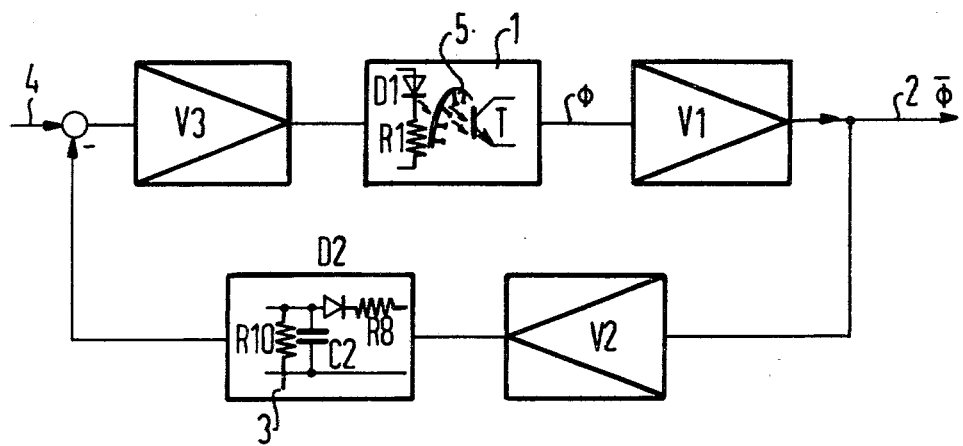
FIG. 1 is a block circuit diagram of a regulating circuit constructed in accordance with the invention.

The exemplary embodiment of the invention illustrated on the drawing employs operational amplifiers of the type described, for example, in U. Tietze-Ch. Schenk, "Semiconductor-circuitry Technique," second expanded publication, published by Springer, Berlin, Heidelberg, New York, Pages 49ff. and 160ff.

Referring to the block circuit diagram of FIG. 1, the opto-electronic scanning system 1 supplies a scanning value $\phi$ to an operational amplifier V1, which inverts this value and forwards it in amplified form, to a digital analysis circuit, via an analysis line 2. A further operational amplifier V2 operates in parallel, and feeds a value corresponding to the peak value of the received brightness to a memory 3 which has transient storage facilities and which is constructed from a rectifier link D2 and a capacitor-resistor path R8, C1. The memory 3 which stores the peak value of the brightness signal for the dark phase operates an operational amplifier V3 in parallel to a theoretical value connected via a line 4. The brightness of the luminescent diode D1 is regulated by the operational amplifier 3.

Figure 2:
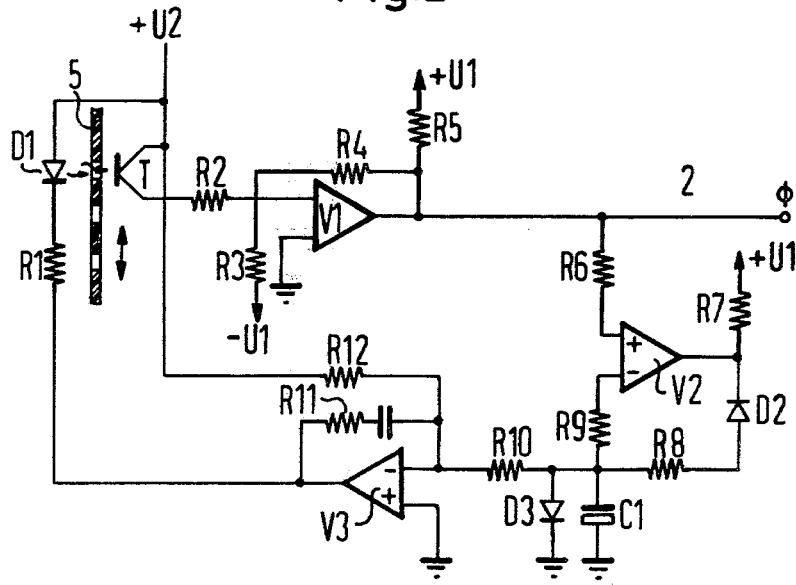
FIG. 2 is a schematic circuit diagram illustrating an embodiment of the invention.

Referring to FIG. 2, a pulse train disc as illustrated in FIG. 1, is shown as a slotted diaphragm 5. The supply voltages U1 and U2 are dimensioned in accordance with the requirements of the circuit elements employed.

When a diaphragm gap in the slotted diaphragm 5 lies between the luminescent diode D1 serving as a light source and a photo transistor T serving as a light receiver, the inverting input of the operational amplifier V1 is fed via a series resistor R2 with a potential which, having been amplified by the operational amplifier V1 and having been inverted is made available for further analysis on the analysis line 2. By way of a resistor R6, this value is fed to a further operational amplifier V2 which, via a rectifier path D2 charges a capacitor C1 to a maximum value corresponding to the brightness received by the transistor T. This value is constantly discharged via a resistor R10. The values for the capacitor C1 and the resistor R10 are designed to be such that short-term fluctuations in brightness recognized by the photo transistor, resulting in particular from functionally dependent dimmings by the slotted diaphragm 5, do not fundamentally influence the regulating process, although longer lasting changes in brightness caused by the luminescent diode D1 are, in fact, recognized and used to regulate this brightness.

The inversion of the value $\phi$ of the brightness received by the transistor T carried out by the operational amplifier V1 is canceled by means of a further inversion carried out by the operational amplifier V3 so that an analog value received when the slotted diaphragm is transmissive is available.

The rectifier path D3 serves only to protect the electrolytic capacitor C1, whereas the capacitor C2 and the resistors (not described in detail) represent conventional circuitry measures used in association with operational amplifiers and with the luminescent diode D1.

Although we have disclosed our invention with reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In an arrangement for controlling a constant signal amplitude in an opto-electronic scanning system in which a diaphragm is periodically interposed between a light source and a light receiver, the improvement in combination therewith, of:

a storage device connected to said light receiver for storing for the duration of a dark phase produced by the diaphragm, a brightness value indicative of the brightness received during a light phase, through a diaphragm gap; and circuit means connected between said storage device and said light source for regulating the brightness of said light source in response to said brightness value.

2. The improved arrangement of claim 1, and further comprising:

a rectifier connected between said light receiver and said storage device; and said circuit means includes a regulating amplifier connected between said storage device and said light source.

3. The improved arrangement of claim 2, wherein said storage device comprises:

a resistor-capacitor combination connected between said diode and the input of said regulating amplifier.

4. The improved arrangement of claim 3, and further comprising:

a switching element in said storage circuit for changing the time constant.

* * * * *